United States Patent
Chhatbar et al.

(10) Patent No.: US 8,983,526 B2
(45) Date of Patent: Mar. 17, 2015

(54) OPTIMIZED STREETLIGHT OPERATION (OSLO) USING A CELLULAR NETWORK OVERLAY

(75) Inventors: Pulin Chhatbar, Plano, TX (US); Miroslav Budic, Murphy, TX (US); Abdennaceaur Lachtar, Plano, TX (US); Ravindra Dongre, Allen, TX (US); Gheorghe Spiride, Plano, TX (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 359 days.

(21) Appl. No.: 13/598,874

(22) Filed: Aug. 30, 2012

(65) Prior Publication Data

US 2013/0116003 A1 May 9, 2013

Related U.S. Application Data

(60) Provisional application No. 61/557,066, filed on Nov. 8, 2011.

(51) Int. Cl.

| | |
|---|---|
| *H04B 7/00* | (2006.01) |
| *H05B 37/02* | (2006.01) |
| *H04W 4/14* | (2009.01) |
| *G08C 17/02* | (2006.01) |
| *H04W 4/06* | (2009.01) |

(52) U.S. Cl.
CPC ............. *H05B 37/0272* (2013.01); *H04W 4/14* (2013.01); *G08C 17/02* (2013.01); *G08C 2201/42* (2013.01); *Y02B 20/72* (2013.01); *H04W 4/06* (2013.01)
USPC ............ 455/524; 455/517; 455/420; 370/328

(58) Field of Classification Search
USPC .......... 455/524, 517, 3.05, 420; 370/328, 338
See application file for complete search history.

(56) References Cited

U.S. PATENT DOCUMENTS

| | | | | |
|---|---|---|---|---|
| 5,745,865 | A * | 4/1998 | Rostoker et al. | ............ 455/456.5 |
| 7,580,705 | B2 * | 8/2009 | Kumar | ........................... 455/420 |
| 2001/0030973 | A1 * | 10/2001 | Lomp et al. | ................... 370/441 |
| 2001/0034239 | A1 * | 10/2001 | Yamato et al. | ................ 455/456 |
| 2007/0201438 | A1 * | 8/2007 | Yoon et al. | ..................... 370/352 |
| 2008/0143493 | A1 * | 6/2008 | Nam et al. | ............... 340/310.11 |
| 2011/0140909 | A1 * | 6/2011 | Olson et al. | ............. 340/870.02 |
| 2011/0140910 | A1 * | 6/2011 | Olson et al. | ............. 340/870.02 |
| 2011/0158202 | A1 * | 6/2011 | Ozukturk et al. | ............ 370/335 |
| 2011/0194571 | A1 * | 8/2011 | Ozluturk et al. | .............. 370/479 |
| 2011/0298634 | A1 * | 12/2011 | Beverung et al. | ........ 340/870.02 |

FOREIGN PATENT DOCUMENTS

WO    WO 03/034570 A2    4/2003

* cited by examiner

*Primary Examiner* — Dominic E Rego

(57) ABSTRACT

An Optimized Streetlight Operation (OSLO) system that utilizes a cellular network overlay to broadcast control commands issued by a centralized Streetlight Operation Center (SOC) to RF control modules mounted on each streetlight pole. The cellular network may be a CDMA network utilizing Short Message Service-Broadcast (SMS-B) messaging. When a Mobile Telephone Exchange/Mobile Switching Center (MTX/MSC) receives a SOC control command from the SOC, the MTX/MSC causes a plurality of BSs to broadcast the SOC command in the network operating area a defined number of times. Each RF control module that successfully receives the broadcast SOC control command, performs actions to control operation of the module's associated streetlight, and transmits a confirmation message to the module's serving BS indicating the SOC command was received. The modules are configured to stagger transmission of the confirmation messages over a period of time to reduce a peak load imposed on the cellular network.

18 Claims, 6 Drawing Sheets

OPTIMIZED STREETLIGHT OPERATION (OSLO) USING A CELLULAR NETWORK OVERLAY

CROSS-REFERENCE TO RELATED APPLICATIONS

This application claims the priority benefit under 35 U.S.C. §119(e) of U.S. Provisional Application No. 61/557,066 filed on Nov. 8, 2011, the disclosure of which is incorporated herein by reference in its entirety.

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISC APPENDIX

Not applicable

TECHNICAL FIELD

The present invention relates to cellular telecommunication systems. More particularly, and not by way of limitation, the present invention is directed to a system and method for controlling operation of a large number of streetlights using a cellular telecommunication network overlay.

BACKGROUND

Existing technology in the area of streetlight monitoring and control widely uses legacy methods where lights are turned on from a central location. City personnel generally do not have visibility into the working/non-working status of the streetlights and maintenance work may be inefficient since technicians may not be easily directed to fix broken lights.

To combat these problems, recent solutions have sought to establish two-way communication with each streetlight pole and to control the lights from control nodes using communication links with each pole. In one solution, the streetlights are divided into segments (for example, a segment may be defined as the lights on the same street) and a control node placed in a central location with respect to the segments controls the segments. Many different control nodes may be linked into a data network, either wired or wireless. In another solution, control nodes equipped with point-to-point Radio Frequency (RF) transmitters/receivers are deployed on streetlight poles. This solution relies on point-to-point RF links to establish a mesh-like network between a subset of streetlights that are located in the same general area. Certain nodes are defined as controllers and centralized commands are distributed through these nodes.

SUMMARY

There are several problems with the existing solutions for controlling streetlights. First, there is a lack of scalability when required to handle a large number of streetlights (for example greater than 500,000) in a short period of time such as five minutes or less. Second, the existing solutions rely on multiple RF technologies (for example Wireless Local Area Network (WLAN) and cellular) or rely on specialized standards where economies of scale are not yet present in the marketplace to allow for significant cost reductions. Third, the existing solutions may require significant effort to deploy a control application since the application may have to support a variety of air interface standards and peculiarities. Fourth, the existing solutions limit the use of cellular network interfaces due to the inherent scalability limitations in the chosen technologies. For example, point-to-point Short Message Service (P2P SMS) messages are not capable of scaling to support hundreds of thousands of streetlights.

In one exemplary embodiment, the present disclosure implements an Optimized Streetlight Operation (OSLO) system that utilizes a cellular network overlay with an RF control module mounted on each streetlight pole. The cellular network may be any cellular network type that supports Short Message Service-Broadcast (SMS-B) messaging. One such cellular network type is a Code Division Multiple Access (CDMA) network. CDMA RF control modules on each streetlight pole receive and relay control commands issued by a centralized Streetlight Operation Center (SOC). SOC control commands sent through the OSLO system can, for example, instruct a streetlight to report usage information, conduct maintenance operations or tests, or turn itself on or off.

In general, the OSLO system utilizes a cellular telecommunication network to broadcast SOC control commands to a multiplicity of RF control modules, each mounted on a different streetlight pole. By using a broadcast service such as SMS-B, the problem of trying to send thousands of P2P SMS messages is overcome. Several repetitions of the broadcast may be utilized to ensure a very high percentage of the RF control modules receive the SOC control command. After carrying out the command, the RF control modules are configured to stagger the transmission of their confirmation messages. The RF control modules may be configured to randomly generate a delay period, or individual modules or groups of modules may be pre-configured with specific, different delay periods. In this way, the peak load of the cellular network is not adversely affected. There is a (potentially configurable) cap on the maximum allowed response time delay. Therefore the random number generator may generate a number in the range [0, 1] which represents a fraction of the maximum allowed time.

In one embodiment, the present disclosure is directed to a method of controlling operation of a plurality of streetlights from a Streetlight Operation Center (SOC) utilizing a cellular telecommunication network having a control node and a plurality of base stations (BSs), wherein each of the plurality of streetlights has a dedicated radio frequency (RF) control module associated therewith for controlling operation of each streetlight. The method includes the steps of receiving by the control node in the cellular telecommunication network, a SOC control command from the SOC; the control node causing the plurality of BSs to broadcast the SOC control command to the plurality of RF control modules; and performing by each RF control module that successfully received the broadcast SOC control command, actions to control operation of the RF control module's associated streetlight. Each RF control module that successfully received the broadcast SOC control command, also transmits a confirmation message to the RF control module's serving BS indicating the SOC command was received. The transmitting step includes staggering transmission of the confirmation messages by the plurality of RF control modules over a period of time to reduce a peak load imposed on the cellular network.

In another embodiment, the present disclosure is directed to a system for controlling operation of a plurality of streetlights utilizing a cellular telecommunication network. The system includes a control node and a plurality of BSs in the cellular telecommunication network; a SOC in communication with the control node; and a plurality of RF control modules, wherein each of the RF control modules is associated with a different one of the streetlights. The control node in the cellular telecommunication network is configured to receive a SOC control command from the SOC, and to cause the plurality of BSs to broadcast the SOC control command to the plurality of RF control modules. Each RF control module that successfully received the broadcast SOC control command is configured to perform actions to control operation of the RF control module's associated streetlight in response to the SOC control command, and to transmit a confirmation message to the RF control module's serving BS indicating the SOC command was received. The RF control modules are configured to stagger transmission of the confirmation messages over a period of time to reduce a peak load imposed on the cellular network.

In another embodiment, the disclosure is directed to a SOC for controlling operation of a plurality of streetlights utilizing a cellular telecommunication network, wherein each of the plurality of streetlights has an associated RF control module. The SOC includes a processor configured to generate a SOC control command by executing a control application stored in a non-transitory memory; and a communication interface configured to send the SOC control command in a first instruction to the cellular telecommunication network, wherein the first instruction instructs the cellular telecommunication network to broadcast the SOC control command throughout a network coverage area.

In a further embodiment of the SOC, the communication interface is configured to receive from the cellular telecommunication network, confirmation messages identifying each of the RF control modules that successfully received the SOC control command. The interface provides the confirmation messages to the processor, which is configured to identify any RF control modules that did not send a confirmation message. The communication interface is further configured to send a second instruction to the cellular telecommunication network to transmit the SOC control command in a point-to-point message to each identified RF control module that did not send a confirmation message.

In another embodiment, the disclosure is directed to a BS in a cellular telecommunication network. The BS includes a communication interface configured to receive from a control node, a streetlight control command in a first instruction, wherein the first instruction instructs the BS to broadcast the streetlight control command; a broadcast message unit; and a processor coupled to a non-transitory memory, wherein the processor is configured to cause the broadcast message unit to broadcast the streetlight control command to a plurality of RF control modules located throughout a coverage area of the BS.

In a further embodiment of the BS, the BS also includes a broadcast rounds counter configured to increment a counter each time the broadcast message unit broadcasts the streetlight control command, and to send a current count to the processor. The processor is configured to determine whether the broadcast message unit has broadcast the streetlight control command a defined number of times, and if not, to cause the broadcast message unit to repeatedly broadcast the streetlight control command until the current count indicates the broadcast message unit has broadcast the streetlight control command the defined number of times.

In another embodiment, the disclosure is directed to an RF control module for controlling operation of an associated streetlight. The RF control module includes a streetlight controller; a transceiver (TX/RX) configured to receive from a BS in a cellular telecommunication network, a streetlight control command in a broadcast message; and a processor coupled to a non-transitory memory, wherein the processor is configured to cause the streetlight controller to perform actions to control operation of the associated streetlight in response to the streetlight control command. The RF control module also includes a confirmation message unit configured to generate a confirmation message confirming receipt of the broadcast message, wherein the RF control module is configured to determine a delay time period, and to transmit the confirmation message to the BS following the delay time period.

A key advantage of the OSLO system is that it implements a scalable command, control, and communication methodology, which enables the system to turn on/off more than 500,000 lights in a short period of time (for example, five minutes or less).

BRIEF DESCRIPTION OF THE DRAWINGS

In the following section, the invention will be described with reference to exemplary embodiments illustrated in the figures, in which.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components, and circuits have not been described in detail so as not to obscure the present invention. Additionally, it should be understood that the invention can be implemented in hardware or in a combination of hardware and software in which a computer processor executes program instructions stored on a non-transitory memory to control one or more telecommunication network nodes to implement the Optimized Streetlight Operation (OSLO) system.

Figure 1:
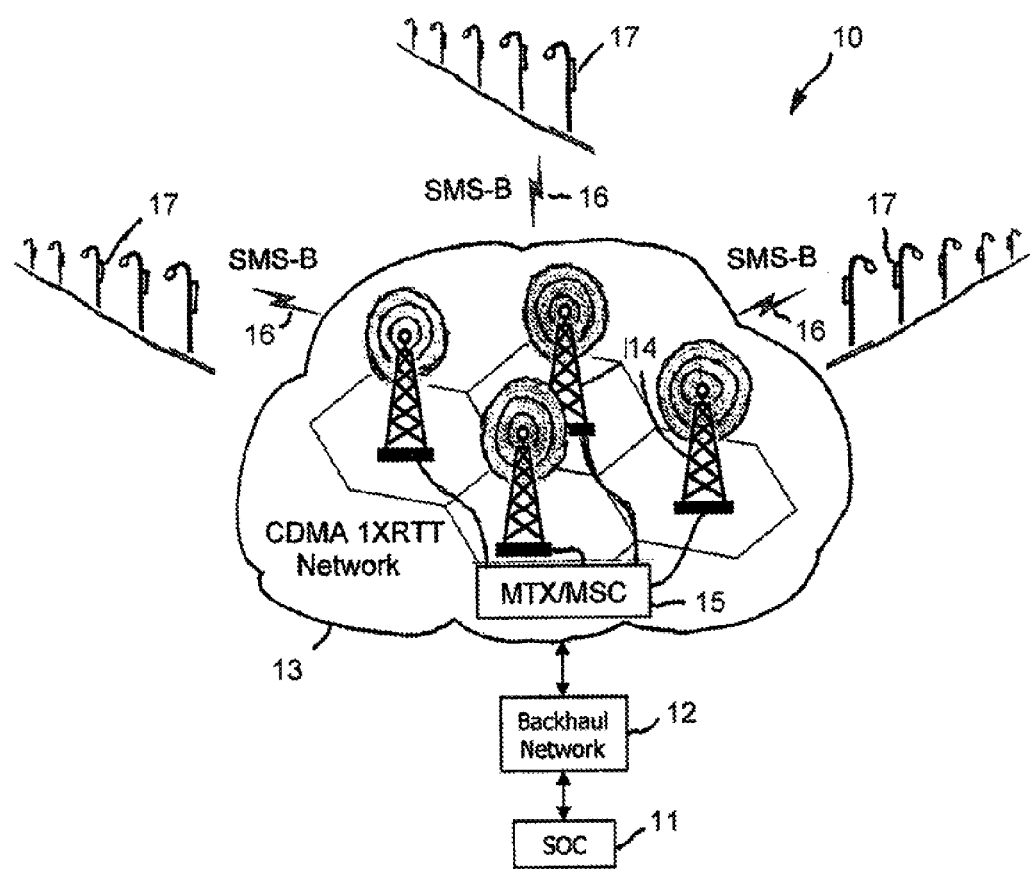
FIG. 1 is a simplified block diagram of an exemplary embodiment of the Optimized Streetlight Operation (OSLO) system of the present disclosure.

FIG. 1 is a simplified block diagram of an exemplary embodiment of the Optimized Streetlight Operation (OSLO) system 10 of the present disclosure. In this embodiment, a SOC 11 runs an OSLO control application to control streetlight operation and maintenance. The SOC is shown in more detail in FIG. 3 below. The SOC may communicate through a backhaul communication network 12 such as an Ethernet, Internet, Protocol (IP), or Asynchronous Transfer Mode (ATM) network to send control messages to a cellular network such as a CDMA2000 1X (IS-2000), 1X Radio Transmission Technology CDMA 1XRTT) cellular network 13.

The CDMA 1XRTT cellular network includes Base Stations (BSs) 14, Base Station Controllers (BSCs), and the appropriate core network equipment such as Packet Data Service Nodes (PDSNs), Mobile Telephone Exchange/Mobile Switching Centers (MTX/MSCs), and Short Message Service Centers (SMSCs). For simplicity, all of the well-known components of the CDMA network are not shown.

When utilizing the exemplary CDMA network 13, SOC control commands may be sent from the SOC 11 to an MTX/MSC 15, for example, in a Short Message Delivery Point-To-Point Invoke (SMDPP_Invoke) message. The MTX/MSC sends the command in an SMS-Broadcast (SMS-B) message to each BS 14 in the desired area of coverage. The BSs broadcast SMS-B messages 16 on the Paging Channel (PCH) to send the SOC control commands to CDMA RF control modules 17 mounted on each streetlight pole. The BSs may repeat the broadcast a preconfigured number of times. The SOC control commands require only two time slots on the Paging Channel for each round of messaging, and do not significantly affect the quality of service experienced by other cellular network users while the OSLO system is operating. When the preconfigured number of rounds have been broadcast, each BSs sends an sms-b delivery response message to the MTX/MSC 15. The MTX/MSC then sends an SMDPP_Return_Result message to the SOC.

Since the SMS-B messages may be broadcast throughout the coverage area of the CDMA cellular network (or any defined sub-areas), the number of CDMA RF control modules that can receive the control messages is essentially unlimited. Rather than being constrained by network limitations, the number of streetlights being controlled is constrained only by geography and the desired density of lighting.

Figure 2:
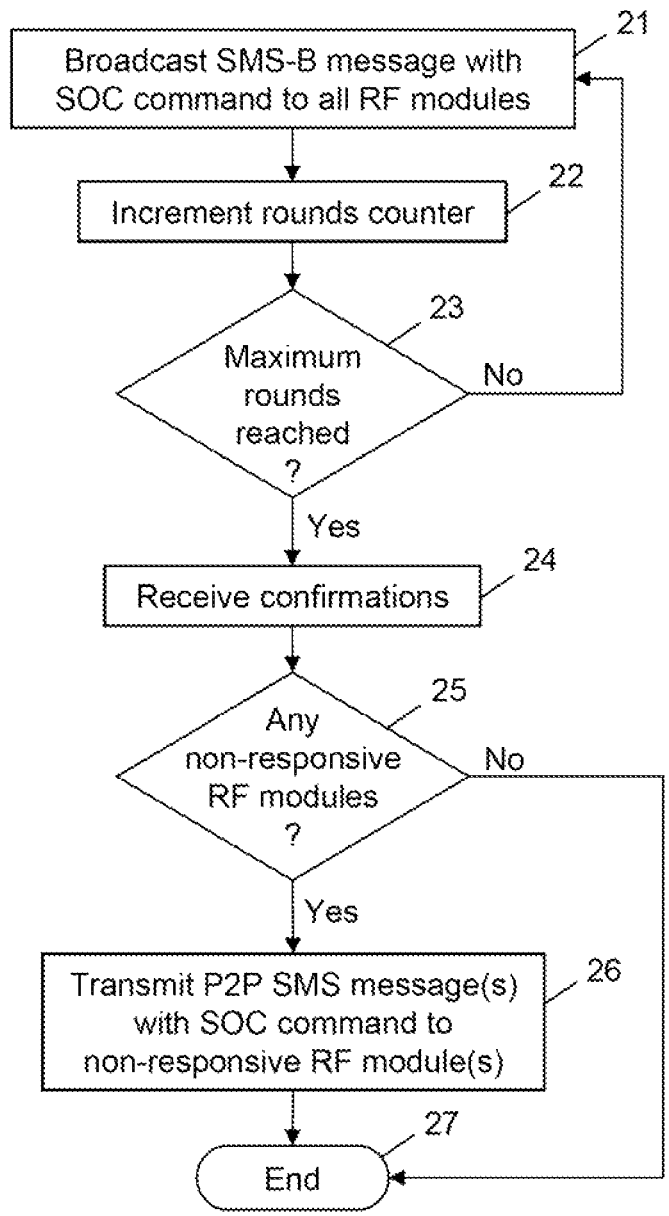
FIG. 2 is a flow chart of an exemplary embodiment of the method of the present disclosure.

FIG. 2 is a flow chart of an exemplary embodiment of the method of the present disclosure for broadcasting SOC control commands to a multiplicity of CDMA RF control modules 17. The method starts at step 21 when the CDMA cellular network 13 receives a control command from the SOC 11 and broadcasts the SOC command in an SMS-B message 16 in some or all of the network coverage area to send the SOC command to the CDMA RF control modules mounted on each streetlight pole. Generally, the SMS-B paging success rate is approximately 97 percent. Therefore, to ensure that virtually all of the CDMA RF control modules successfully receive the SOC command, the OSLO system repeats the CDMA SMS-Broadcast messages a number of times (for example, five or six rounds). Thus, at step 22 a rounds counter is incremented, and at step 23 it is determined whether the maximum number of rounds has been reached. The maximum number of rounds may be operator-configured and may be designed to achieve a desired paging success rate. CDMA RF control modules that receive duplicate SOC commands may be programmed to ignore the duplicate commands. Since the success rate for each round is approximately 97 percent, the OSLO system can drive the success rate higher with only a few additional rounds. If the maximum number of rounds has not been reached, the method returns to step 21 and broadcasts another copy of the SMS-B message.

This broadcasting process continues until the maximum number of rounds is reached and the method moves to step 24, where the cellular network receives confirmations from the CDMA RF control modules 17. Confirmation messages sent from the CDMA RF control modules could potentially adversely affect the cellular network load, especially if hundreds of thousands of CDMA RF control modules attempt to send confirmations near simultaneously after a control command is broadcast. Therefore, the CDMA RF control modules are programmed to stagger their responses over a period of time to reduce the load on the cellular network. Each module may, for example, select a random time within a preconfigured time period to send the confirmation. Alternatively, specified delay periods may be assigned to different modules or to different groups of modules. Since the confirmations are not time-critical, different groups of CDMA RF control modules may be programmed to send their confirmations over a period of several minutes or longer. For example, depending on the number of remote modules per cell and the throughput of the cellular network being utilized, the responses may be spread over a 30-minute time period to avoid congestion. With smaller numbers of modules or greater network throughput, this period may be shorter.

The SOC 11 has a listing of all of the CDMA RF control modules 17, and each confirmation message identifies the CDMA RF control module 17 sending the confirmation. Thus at step 25, the SOC can identify which modules have responded and which, if any, have not. If there are no non-responding modules, the method ends at step 27. However, if non-responding modules are identified, the method moves to step 26, where the SOC instructs the CDMA cellular network to send a point-to-point (P2P) SMS message with the control command to each identified non-responsive module. In this way, any of the modules that may have been missed by the broadcast SMS-B messages are contacted directly and provided with the SOC control command.

Figure 3:
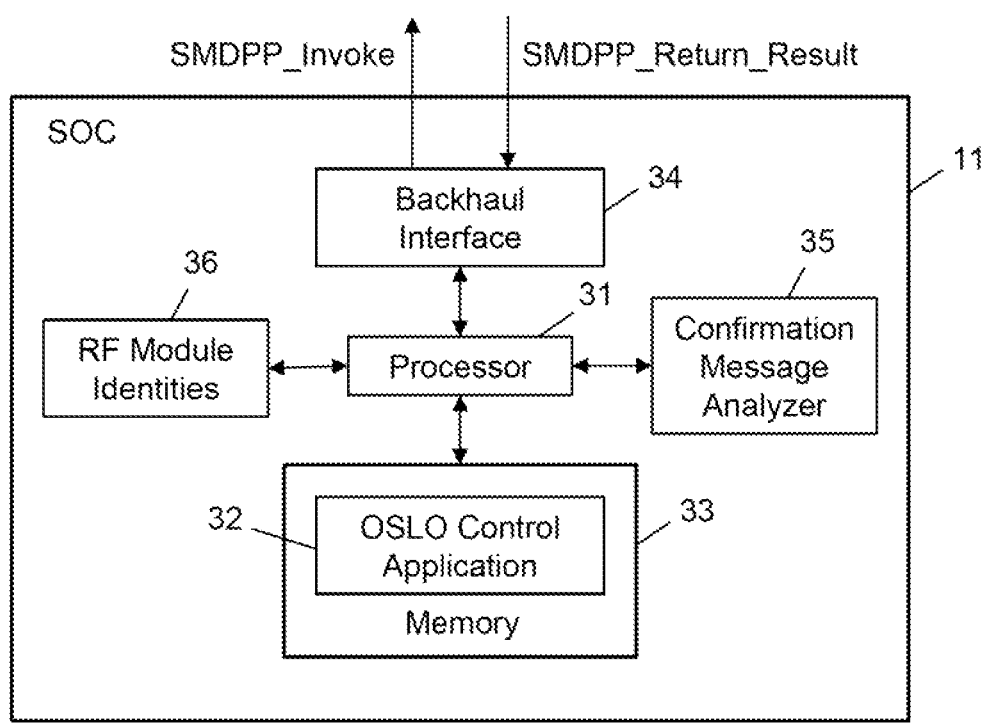
FIG. 3 is a simplified block diagram of an exemplary embodiment of a Streetlight Operation Center (SOC) in accordance with the present disclosure.

FIG. 3 is a simplified block diagram of an exemplary embodiment of the SOC 11 in accordance with the present disclosure. Operation of the SOC may be controlled by a computer processor 31 executing the OSLO control application 32 stored on a non-transitory memory 33. The processor constructs a SOC control command and sends the command with a broadcast instruction to a backhaul interface 34. The backhaul interface may send the SOC control command in an SMDPP_Invoke message through the backhaul network 12 to the MTX/MSC 15.

When the BSs 14 in the CDMA network have broadcast the SOC control command the preconfigured number of rounds, the CDMA RF control modules 17 begin sending confirmation reports. The MTX/MSC 15 forwards the confirmations to the SOC where a confirmation message analyzer 35 compares the RF control module identities in the received confirmation messages with a stored list of RF control module identities 36 to identify any RF control modules that did not respond. If there are any such non-responsive RF control modules, the processor 31 constructs a SOC control command and sends the command with a P2P instruction to the backhaul interface 34. The backhaul interface may send the SOC control command in an SMDPP_Invoke message through the backhaul network 12 to the MTX/MSC 15, which instructs the appropriate BS to transmit the command in a P2P SMS message to the non-responsive RF control module.

Figure 4:
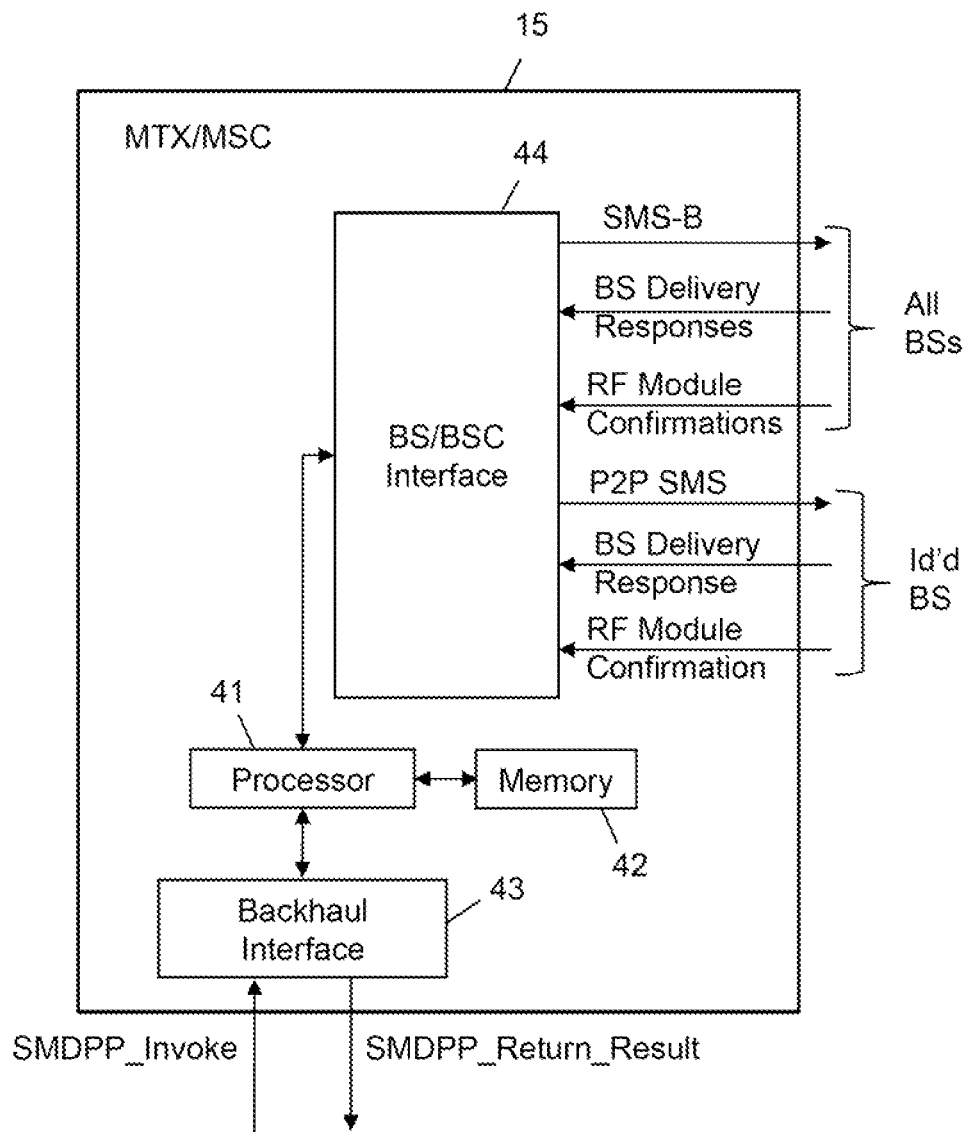
FIG. 4 is a simplified block diagram of an exemplary embodiment of a Mobile Telephone Exchange/Mobile Switching Center (MTX/MSC) in accordance with the present disclosure.

FIG. 4 is a simplified block diagram of an exemplary embodiment of the MTX/MSC 15 in accordance with the present disclosure. Operation of the MTX/MSC may be controlled by a computer processor 41 executing computer program instructions stored on a non-transitory memory 42. When a backhaul interface 43 receives an SMDPP_Invoke message from the SOC 11, the processor determines whether the embedded SOC control command is to be broadcast to all RF control modules or transmitted to an identified RF control module. When the SOC command is to be broadcast to all RF control modules, the processor causes an interface 44 to the BSs 14 in the network (or to a controlling BSC) to generate an SMS-B message with the command, and to send the SMS-B message to all BSs 14. When the BSs have broadcast the SOC control command in an SMS-B message to all CDMA RF control modules 17 the preconfigured number of rounds, the BSs return delivery responses to the MTX/MSC. Thereafter, when the CDMA RF control modules begin sending confirmation reports, the BSs return the confirmations to the MTX/MSC, which forwards the confirmations to the SOC 11.

If the SOC 11 determines there are RF control modules that did not respond, the SOC may send an SMDPP_Invoke message to the MTX/MSC 15 instructing the network to send a P2P SMS message with the SOC control command to each non-responsive RF control module 17. The MTX/MSC identifies the BS associated with each non-responsive RF control module and sends the P2P SMS message to the identified BS. The MTX/MSC then receives a delivery response from the BS and receives an RF control module confirmation if the P2P SMS message was successful in delivering the SOC control command to the RF control module. Once again, the MTX/MSC forwards the confirmation to the SOC 11.

Figure 5:
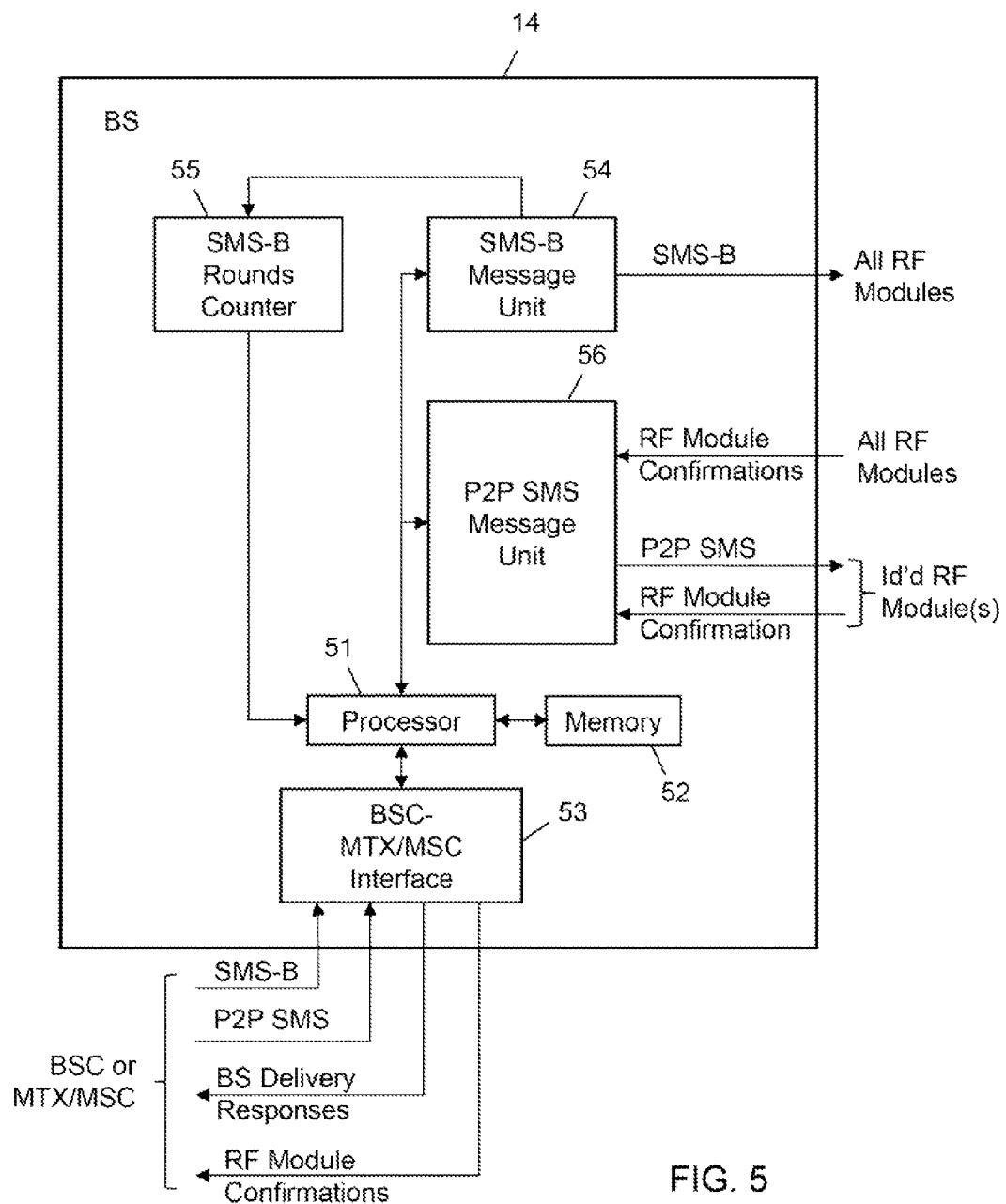
FIG. 5 is a simplified block diagram of an exemplary embodiment of a Base Station (BS) in accordance with the present disclosure.

FIG. 5 is a simplified block diagram of an exemplary embodiment of the BS 14 in accordance with the present disclosure. Operation of the BS may be controlled by a computer processor 51 executing computer program instructions stored on a non-transitory memory 52. When a BSC-MTX/MSC interface 53 receives a SOC control command from the MTX/MSC 15 (or via a BSC), the processor determines whether the command is received in an SMS-B message to be broadcast to all RF control modules 17, or is received in a P2P SMS message to be transmitted only to an identified RF control module (or several identified modules). When the SOC command is to be broadcast to all RF control modules, the processor forwards the command to an SMS-B message unit 54, which broadcasts the command to all RF control modules. Upon broadcasting the SMS-B message, an SMS-B rounds counter increments a counter and notifies the processor of the current count. If the current count is less than the configured maximum number of rounds, the processor instructs the SMS-B message unit to broadcast the SMS-B message again. This process continues until the current count equals the configured maximum number of rounds, at which time the processor stops the broadcasting and sends a BS delivery response to the MTX/MSC 15.

Alternatively, when the processor 51 determines that the SOC command is to be transmitted to an identified RF control module or several identified modules, the processor forwards the command to a P2P SMS message unit 56, which transmits the command only to the RF control module or modules identified in the P2P SMS message received from the MTX/MSC 15. The BS 14 then sends a BS delivery response to the MTX/MSC 15.

Subsequently, the RF control modules 17 start sending confirmations, which may be, for example, P2P SMS messages or 1× packet data. In the exemplary embodiment shown in FIG. 5, the confirmations are shown as P2P SMS messages received by the P2P SMS message unit 56. The BS 14 then sends the confirmations to the MTX/MSC 15 for forwarding to the SOC 11.

Figure 6:
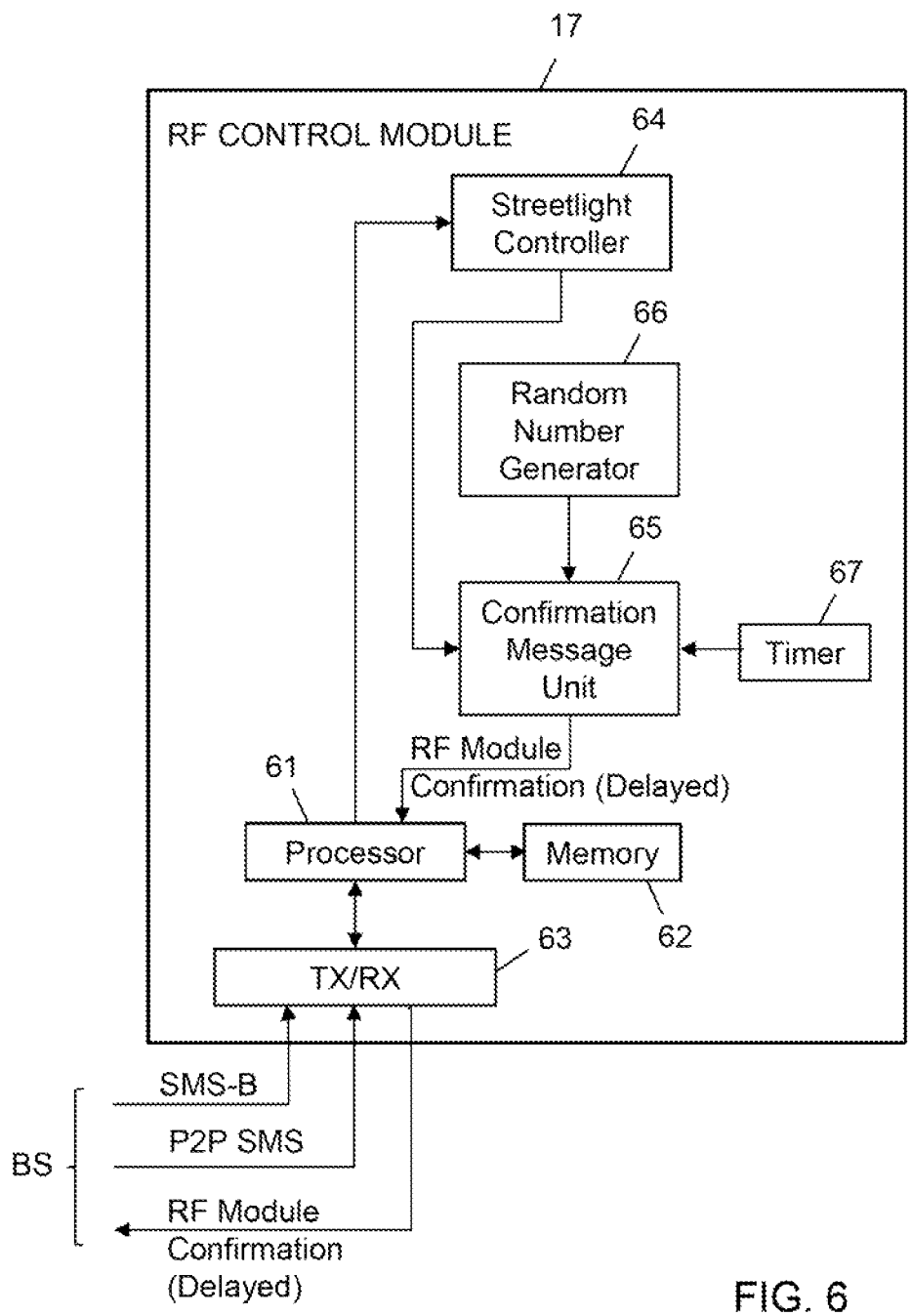
FIG. 6 is a simplified block diagram of an exemplary embodiment of a radio frequency (RF) module in accordance with the present disclosure.

FIG. 6 is a simplified block diagram of an exemplary embodiment of the RF control module 17 in accordance with the present disclosure. Operation of the RF control module may be controlled by a computer processor 61 executing computer program instructions stored on a non-transitory memory 62. When a transceiver (TX/RX) 63 receives a SOC control command from the BS 14 in either an SMS-B message or a P2P SMS message, the processor extracts the command from the message and sends the command to a streetlight controller 64, which takes the appropriate actions to carry out the command. If the processor determines the SOC control command has already been received (for example when the cellular network repeats the SMS-B broadcast), the processor is configured to ignore the duplicate command.

Once the streetlight controller 64 has performed the command, the controller notifies a confirmation message unit 65 that the command has been performed. Rather than immediately generating and sending a confirmation message, the confirmation message unit may delay for a time period, which may be randomly generated by a random number generator 66. A maximum allowed response interval may be preconfigured, and the random number generator is configured to generate delays that fall within the maximum allowed response interval. The random number generator may provide a random number input to the confirmation message unit. A timer 67 also provides an input for the confirmation message unit to determine when the random delay time period has expired. When the random delay time period expires, the confirmation message unit provides the delayed RF control module confirmation to the processor 61, which causes the TX/RX 63 to transmit the confirmation to the BS 14. In this way, confirmations from a large number of RF control modules are staggered over time, thus reducing the peak load on the cellular network.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of controlling operation of a plurality of streetlights from a Streetlight Operation Center (SOC) utilizing a cellular telecommunication network having a control node and a plurality of base stations (BSs), wherein each of the plurality of streetlights has a dedicated radio frequency (RF) control module associated therewith for controlling operation of each streetlight, the method comprising the steps of:
   receiving by the control node in the cellular telecommunication network, a SOC control command from the SOC;
   the control node causing the plurality of BSs to broadcast the SOC control command to the plurality of RF control modules, wherein each BS provides RF coverage to a respective portion of the plurality of RF control modules, and wherein each BS is configured to perform the following steps to increase the number of RF control modules that successfully receive the SOC control command:
      implement a counter to count each time the BS broadcasts the SOC control command, and
      repeatedly broadcast the SOC control command to the respective portion of the RF control modules until a current count of the counter indicates that the SOC control command has been broadcast a defined number of times;
   performing by each RF control module that successfully received the broadcast SOC control command, actions to control operation of the RF control module's associated streetlight; and
   transmitting by each RF control module that successfully received the broadcast SOC control command, a confirmation message to the RF control module's serving BS indicating the SOC command was received, wherein the transmitting step includes staggering transmission of the confirmation messages by the plurality of RF control modules over a period of time to reduce a peak load imposed on the cellular network.

2. The method as recited in claim 1, further comprising the steps of:
forwarding from the cellular network to the SOC, the confirmation messages transmitted by the RF control modules, wherein each confirmation message includes an identifier of the RF control module that transmitted the confirmation message;
identifying by the SOC, any RF control modules that did not send a confirmation message; and
sending an instruction from the SOC to the cellular network instructing the cellular network to transmit the SOC control command in a point-to-point message to each identified RF control module that did not send a confirmation message.

3. The method as recited in claim 1, wherein the step of staggering transmission of the confirmation messages by the plurality of RF control modules over a period of time includes:
calculating by each RF control module, a random time delay; and
transmitting by each RF control module, the confirmation message upon expiration of the random time delay.

4. The method as recited in claim 1, wherein the step of staggering transmission of the confirmation messages by the plurality of RF control modules over a period of time includes transmitting, by each RF control module, the confirmation message upon expiration of a randomly generated time delay, wherein different RF control modules may be pre-configured with maximum allowed confirmation time delays.

5. The method as recited in claim 1, wherein the BSs broadcast the SOC control command to the plurality of RF control modules in a Short Message Service-Broadcast (SMS-B) message.

6. The method as recited in claim 1, wherein the cellular telecommunication network is a Code Division Multiple Access (CDMA) network, and the RF control modules are CDMA RF control modules.

7. A system for controlling operation of a plurality of streetlights utilizing a cellular telecommunication network, the system comprising:
a control node and a plurality of base stations (BSs) in the cellular telecommunication network;
a Streetlight Operation Center (SOC) in communication with the control node; and
a plurality of radio frequency (RF) control modules, wherein each of the RF control modules is associated with a different one of the streetlights;
wherein the control node in the cellular telecommunication network is configured to receive a SOC control command from the SOC, and to cause the plurality of BSs to broadcast the SOC control command to the plurality of RF control modules, wherein each BS provides RF coverage to respective portion of the plurality of RF control modules, and wherein each BS is configured to perform the following steps to increase the number of RF control modules that successfully receive the SOC control command:
implement a counter to count each time the BS broadcasts the SOC control command, and
repeatedly broadcast the SOC control command to the respective portion of the RF control modules until a current count of the counter indicates that the SOC control command has been broadcast a defined number of times; and
wherein each RF control module that successfully received the broadcast SOC control command is configured to perform actions to control operation of the RF control module's associated streetlight in response to the SOC control command, and to transmit a confirmation message to the RF control module's serving BS indicating the SOC command was received, wherein the RF control modules are configured to stagger transmission of the confirmation messages over a period of time to reduce a peak load imposed on the cellular network.

8. The system as recited in claim 7, wherein:
the control node in the cellular telecommunication network is configured to forward to the SOC, the confirmation messages transmitted by the RF control modules, wherein each confirmation message includes an identifier of the RF control module that transmitted the confirmation message; and
the SOC is configured to identify any RF control modules that did not send a confirmation message, and to send an instruction to the control node in the cellular telecommunication network instructing the cellular network to transmit the SOC control command in a point-to-point message to each identified RF control module that did not send a confirmation message.

9. The system as recited in claim 7, wherein each of the plurality of RF control modules includes:
a random number generator for generating a random number corresponding to a random delay time period; and
a timer for determining when the random delay time period has expired;
wherein each RF control module is configured to transmit the confirmation message upon expiration of the random delay time period.

10. The system as recited in claim 7, wherein the RF control modules are configured to stagger transmission of the confirmation messages over a period of time by transmitting, by each RF control module, the confirmation message upon expiration of a random delay time period, wherein different RF control modules may be pre-configured with maximum allowed confirmation time delay.

11. The system as recited in claim 7, wherein the BSs are configured to broadcast the SOC control command to the plurality of RF control modules in a Short Message Service-Broadcast (SMS-B) message.

12. The system as recited in claim 7, wherein the cellular telecommunication network is a Code Division Multiple Access (CDMA) network, and the RF control modules are CDMA RF control modules.

13. A Streetlight Operation Center (SOC) for controlling operation of a plurality of streetlights utilizing a cellular telecommunication network, wherein each of the plurality of streetlights has an associated radio frequency (RF) control module, the SOC comprising:
a processor configured to generate an SOC control command by executing a control application stored in a non-transitory memory; and
a communication interface configured to send the SOC control command in a first instruction to the cellular telecommunication network, wherein the first instruction instructs the cellular telecommunication network to broadcast the SOC control command throughout a network coverage area, wherein:
the communication interface is configured to receive from the cellular telecommunication network, confirmation messages identifying each of the RF control modules that successfully received the SOC control command,
the processor is configured to identify any RF control modules that did not send a confirmation message, and
the communication interface is configured to send a second instruction to the cellular telecommunication network to transmit the SOC control command in a point-to-point message to each identified RF control module that did not send a confirmation message.

14. A base station (BS) in a cellular telecommunication network, the BS comprising:
a communication interface configured to receive from a control node, a streetlight control command in an instruction, wherein the instruction instructs the BS to broadcast the streetlight control command;
a broadcast message unit;
a processor coupled to a non-transitory memory, wherein the processor is configured to cause the broadcast message unit to broadcast the streetlight control command to a plurality of radio frequency (RF) control modules located throughout a coverage area of the BS; and
a broadcast rounds counter configured to implement a counter that generates a current count each time the broadcast message unit broadcasts the streetlight control command, and to send the current count to the processor,
wherein the processor is configured to determine whether the broadcast message unit has broadcast the streetlight control command a defined number of times, and if not, to cause the broadcast message unit to repeatedly broadcast a copy of the streetlight control command until the current count indicates the broadcast message unit has broadcast the streetlight control command the defined number of times.

15. The BS as recited in claim 14, further comprising a point-to-point (P2P) message unit configured to receive over a period of time, confirmation messages from the plurality of RF control modules, and to send the confirmation messages to the processor for forwarding through the communication interface to the control node.

16. The BS as recited in claim 15, wherein the P2P message unit is further configured to transmit the streetlight control command in P2P messages directly to identified RF control modules from which confirmation messages were not received.

17. A radio frequency (RF) control module for controlling operation of an associated streetlight, the RF control module comprising:
a streetlight controller;
a transceiver (TX/RX) configured to receive from a base station (BS) in a cellular telecommunication network, a streetlight control command in a broadcast message;
a processor coupled to a non-transitory memory, wherein the processor is configured to cause the streetlight controller to perform actions to control operation of the associated streetlight in response to the streetlight control command;
a confirmation message unit configured to generate a confirmation message confirming receipt of the broadcast message;
a random number generator for generating a random number corresponding to a random delay time period; and
a timer for determining when the random time delay has expired,
wherein the RF control module is configured to transmit the confirmation message to the BS upon expiration of the random delay time period.

18. The RF control module as recited in claim 17, wherein the RF control module is pre-configured with maximum allowed confirmation time delay.

* * * * *